United States Patent [19]

Donaldson

[11] Patent Number: 5,279,130
[45] Date of Patent: Jan. 18, 1994

[54] AUXILIARY REFRIGERATED AIR SYSTEM WITH ANTI-ICING

[75] Inventor: Richard M. Donaldson, Loveland, Ohio

[73] Assignee: General Electric Company, Cincinnati, Ohio

[21] Appl. No.: 900,356

[22] Filed: Jun. 18, 1992

[51] Int. Cl.⁵ .................................................. F25B 9/00
[52] U.S. Cl. .............................. 62/86; 62/172; 62/401
[58] Field of Search .................. 62/86, 87, 88, 401, 62/172

[56] References Cited

U.S. PATENT DOCUMENTS

| | | | |
|---|---|---|---|
| Re. 32,100 | 4/1986 | Rannenberg | 62/80 |
| 2,356,370 | 8/1944 | Allen | 123/122 |
| 2,992,542 | 7/1961 | Arthur | 62/156 |
| 3,208,234 | 9/1965 | Messinger | 62/172 |
| 3,355,905 | 12/1967 | Berhold et al. | 62/156 |
| 3,623,332 | 11/1971 | Fernandes | 62/172 |
| 4,196,773 | 4/1980 | Trumpler | 165/62 |
| 4,262,495 | 4/1981 | Gupta et al. | 62/402 |
| 4,580,406 | 4/1986 | Nims | 62/87 |
| 5,036,678 | 8/1991 | Renninger et al. | 62/402 |

FOREIGN PATENT DOCUMENTS 2237372  5/1991  United Kingdom .

*Primary Examiner*—Ronald C. Capossela
*Attorney, Agent, or Firm*—Jerome C. Squillaro

[57] ABSTRACT

To prevent icing in an auxiliary refrigerated air system utilized in jet aircraft for environmental control purposes, wherein high pressure, high temperature input air bleed from the engine compressor is boosted in pressure and temperature, cooled in a heat exchanger and expanded in a turbine to produce refrigerated output air flowing through an output duct, a portion of the input air is diverted to warm appropriate parts of the expansion turbine to prevent ice accretion thereto. To prevent icing of the output duct, input air is also diverted to warm the duct wall. Alternatively, the engine fuel line is coiled about the output duct in heat exchanging relation to warm the duct wall.

14 Claims, 1 Drawing Sheet

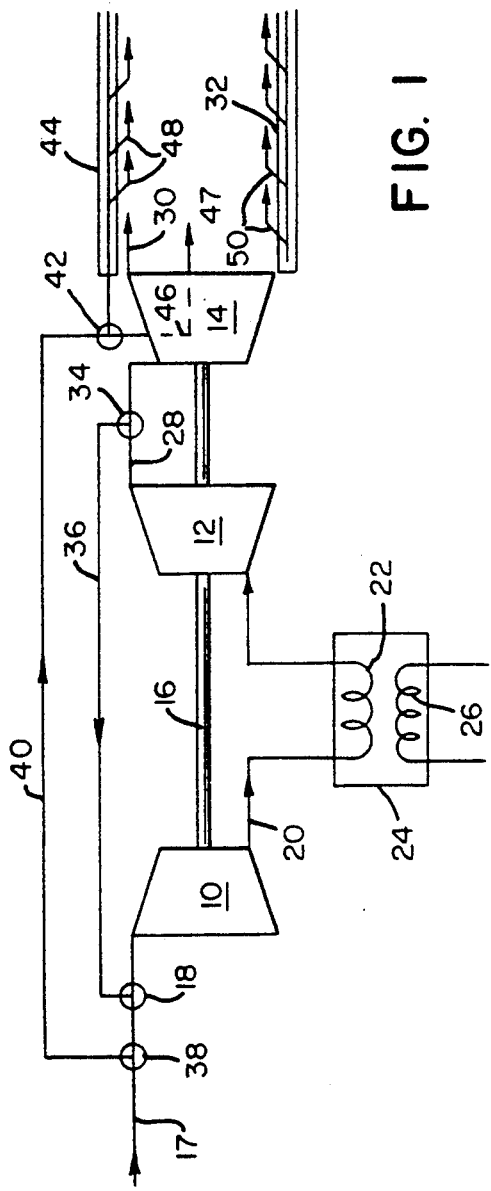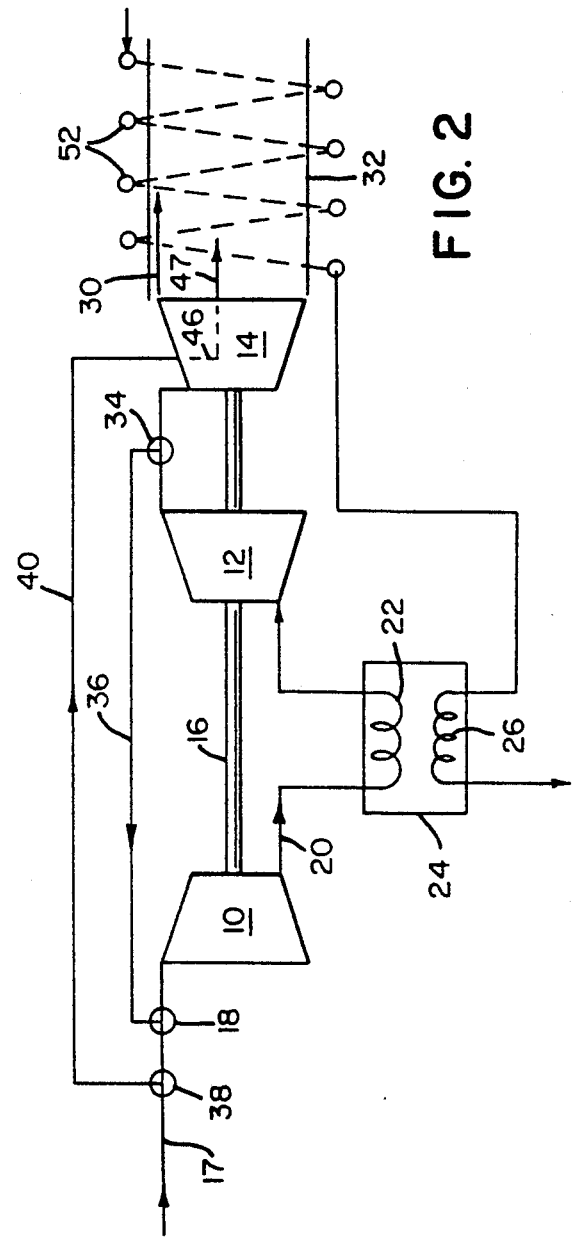

AUXILIARY REFRIGERATED AIR SYSTEM WITH ANTI-ICING

The present invention relates to environmental control systems for gas turbine engine-powered aircraft and particularly to provisions for preventing the formation of ice in such systems.

BACKGROUND OF THE INVENTION

It is well known to provide in jet aircraft an auxiliary system to produce both conditioned air to the cabin compartment for passenger comfort and refrigerated air for avionics cooling. Heretofore, cooling requirements for avionics and other components have been relatively modest. However, emerging low temperature technologies in, for example, super conductivity and magnetic bearings are presenting potentially beneficial applications in jet aircraft, assuming sufficient quantities of refrigerated air can be produced to create requisite low temperature operating environments. Since the air will have to be cooled to lower temperatures, well below 0° F., the potential for icing increases dramatically. If the ambient input air to a refrigeration system contains any moisture, freezing will result, and ice will accrete to surfaces of system components. Refrigeration system performance is thus degraded.

The typical anti-icing approach is to remove moisture from the input air. Thus, cold air producing systems are equipped with separators which act to centrifuge water from the chilled air before freezing can occur. This approach requires additional flowpath volume in order to provide sufficient residence time to condense and centrifuge substantially all of the moisture from the air. Moreover, to provide effective separator operation, the chilled air temperature must be held within a relatively narrow band, which is difficult to achieve considering the wide range of flight conditions and power settings typically encountered in jet aircraft applications. Moreover, a moisture separator requires additional space and typically a reconfiguration of the refrigeration system to accommodate its inclusion at the appropriate location in the system.

Commonly assigned Renninger et al. U.S. Pat. No. 5,036,678 discloses a jet aircraft auxiliary refrigerated air system capable of cooling input air at a typical temperature of 1150° F. down to a temperature well below freezing for environmental control purposes. However, this patent does not address the problem of icing.

SUMMARY OF THE INVENTION

It is the objective of the present invention to equip an auxiliary refrigerated air system of the type disclosed in U.S. Pat. No. 5,036,678 so as to prevent icing of the system components. A further objective is to prevent icing in such systems without resort to moisture separators.

To this end, the auxiliary refrigerated air system of the present invention includes an auxiliary compressor and a pair of tandemly arranged turbine components drivingly connected by a shaft. Moisture-laden, compressed air at an elevated temperature, bled from the output of a compressor in a gas turbine engine, is further compressed in the auxiliary compressor, cooled in a heat exchanger, and expanded in the first and then the second of the tandem turbine components. Refrigerated air, discharged by the second turbine component, is conveyed by an output duct to aircraft support system locations where environmental control is desired.

To prevent ice accretion to the system components handling the air as its temperature falls below freezing, which are the second of the tandem turbine components and its output duct, a portion of the high temperature input air to the auxiliary compressor is diverted to the second turbine component. This air is circulated through internal cavities of this turbine component to maintain the surfaces thereof contacting the below freezing air at temperatures above freezing. Then to prevent ice accretion to the output duct in accordance with one embodiment of the invention, a portion of the turbine warming air is diverted to a manifold surrounding the output duct for injection through plural orifices in the output duct into the refrigerated airstream. This injected air creates a warm air layer that both warms the inner walls of the output duct and separates the duct wall from the refrigerated airstream, thus to inhibit icing.

In an alternative embodiment of the invention, a heat sinking fluid, such as engine fuel, is conveyed through one or more fuel lines coiled about the output duct to warm the duct wall, thereby inhibiting ice accretion thereto.

The invention accordingly comprises the features of construction, combination of elements and arrangements of parts, all as described hereinafter, and the scope of the invention will be indicated in the claims.

BRIEF DESCRIPTION OF THE DRAWINGS

For a full understanding of the nature and objectives of the present invention, reference may be had to the following Detailed Description taken in conjunction with the accompanying drawing, in which:

FIG. 1 is a schematic diagram of an auxiliary refrigerated air system for jet aircraft, which is constructed in accordance with one embodiment of the present invention; and FIG. 2 is a schematic diagram of an auxiliary refrigerated air system constructed in accordance with an alternative embodiment of the present invention.

Corresponding reference numerals refer to like parts throughout the several views of the drawing.

DETAILED DESCRIPTION

The auxiliary refrigerated air system, in the embodiment of the invention illustrated in FIG. 1, includes an auxiliary compressor 10 and a pair of tandemly-arranged turbine components 12 and 14 drivingly connected by a common shaft 16. High temperature, high pressure input air 17, bled from the output of the core engine compressor (not shown) of a gas turbine engine, is conveyed through a mixing valve 18 to the low pressure, input side of auxiliary compressor 10. The input air is further compressed and elevated in temperature by the auxiliary compressor and discharged along a flow path 20 to the high pressure input side of the first 12 of the pair of expansion turbine components through coils 22 of a heat exchanger, generally indicated at 24. Coils 22 are thermally coupled with heat exchanger coils 26 through which a heat sinking fluid is pumped. A suitably and readily available heat sinking fluid is gas turbine engine fuel. Air, with some of its heat removed by the heat exchanger, is expanded and cooled by turbine component 12. The discharge of chilled air from turbine component 12 is fed over a flow path 28 to turbine component 14 which further expands and cools the air to produce freezing temperature air 30 discharged into a duct 32 for conveyance to locations where environmental control is desired. The energy extracted from the air by the turbine components is typically sufficient to drive auxiliary compressor 10. If not, external power is applied to shaft 16 as a supplement. Included in flow path 28 is a dividing valve 34 which diverts some of the chilled air discharged by turbine component 12 back to mixing valve 18 over a recirculation path 36. The chilled recirculated air is mixed with the high temperature input air 17 to produce a reduced temperature air mixture as the input to auxiliary compressor 10.

The foregoing description describes the auxiliary refrigerated air system disclosed and claimed in the above-cited U.S. Pat. No. 5,036,678. Reference may be had to this patent for a more detailed description of the system operation.

Not addressed in this patent is the potential for ice accretion to surfaces of turbine component 14 as the chilled, moisture-laden air from turbine component 12 is refrigerated to temperatures well below freezing by turbine component 14. Icing of the interior surface of output duct 32 is also a major concern. To prevent icing of turbine component 14 and duct 32 in accordance with the embodiment of the present invention seen in FIG. 1, a dividing valve 38 is provided in the input air flowpath upstream of mixing valve 18. This dividing valve diverts a metered portion of the high temperature input air over a flowpath 40 to a dividing valve 42. Here the diverted high temperature input air is divided between a manifold 44 surrounding discharge duct 32 and turbine component 14. The high temperature air going to turbine component 14 is routed through internal cavities, indicated schematically by dashed line 46, to warm those surfaces of this turbine component, i.e., blade and shroud surfaces, which are contacted by the moisture-laden air during refrigeration to below freezing temperatures. The warming air exits these cavities, as indicated by arrow 47, and is mixed with the refrigerated air stream 30 entering duct 32. Consequently, ice accretion to surfaces of the expansion turbine 14 is prevented.

The high temperature air going to manifold 44 flows along the output duct exterior to warm the wall thereof. In addition, portions of the high temperature air flowing through this manifold are injected, as indicated by arrows 48, through circumferentially and longitudinally distributed orifices 50 in the duct wall to create a warm air boundary layer separating the duct interior wall surface from the below freezing airstream 30. As a consequence, icing of the discharge duct interior surface is prevented. Since the heating load is relatively small, approximately 10-15% effectiveness, the amount of high temperature air diverted by dividing valve 38 is sufficiently low that the loss of system performance is not significant.

In the embodiment of the invention seen in FIG. 2, high temperature input air bled from input airstream 17 is utilized solely to prevent icing in turbine component 14 in the same manner as described above for the embodiment of FIG. 1. To prevent icing of output duct 32, the fuel line leading to coil 26 of heat exchanger 24 is coiled around the discharge duct in heat exchanging relation, as indicated at 52. The relatively warm fuel flowing through this heat exchanging coil 52 maintains the discharge duct sufficiently war to prevent the formation of ice on its interior wall surface. Since, in the embodiment of FIG. 2, input bleed air is only used to prevent icing in turbine component 14, system performance is improved over that achieved in the embodiment of FIG. 1. Moreover, since the same heat sinking fluid is used to warm the output duct and to cool the compressor 10 discharge air in heat exchanger 24, system performance is further enhanced. This is due to the fact that the heat sinking fluid, e.g., engine fuel, is precooled in heat exchanging coil 52 prior to reaching heat exchanging coil 26, thus increasing the air cooling capacity of heat exchanger 24.

From the foregoing description, it is seen that the present invention effectively and efficiently overcomes the problem of icing in an auxiliary refrigerated air system without resort to separators to remove moisture from the high temperature, high pressure input air 17. While turbine components 12 and 14 are illustrated as separate expansion turbines, they may be embodied as separate stages of a single turbine. The heat sinking fluid herein is preferably engine fuel because of its ready availability, however it will be appreciated that a different fluid could be utilized. While core engine compressor discharge air has been disclosed as the source of input air 17, other sources of pressurized input air, such as ram air, fan bleed air, etc., may be utilized. Accordingly, since certain changes may be made in the constructions set forth in the Detailed Description and accompanying drawings without departing from the scope of the present invention, it is intended that matters of detail be taken as illustrative and not in a limiting sense.

Having described my invention, what I claim as new and desire to secure by Letters Patent is:

1. An auxiliary refrigerated air system comprising, in combination:
    A. a compressor having an input for receiving high pressure, high temperature input air and operating to produce at an output thereof discharge air of increased pressure and temperature;
    B. expansion turbine means for extracting energy from said discharge air to produce refrigerated output air;
    C. an output duct communicating with said expansion turbine means for conveying said output air to a utilization location;
    D. means for diverting a portion of said input air from said compressor to a first anti-icing means in heat exchanging relation with said expansion turbine means, so as to prevent ice accretion therein; and
    E. second anti-icing means in heat exchanging relation with said output duct for warming said output duct to prevent ice accretion thereto;
    F. wherein said input air portion exits from said first anti-icing means into said output duct wherein said input air portion mixes with said refrigerated output air entering said output duct form said expansion turbine means.

2. The auxiliary refrigerated air system defined in claim 1, wherein said second anti-icing means includes a heat exchanging coil exterior to and surrounding said output duct and a heat sinking fluid flowing through said heat exchanging coil to warm said output duct.

3. The auxiliary refrigerated air system defined in claim 1, which further includes a shaft drivingly connecting said expansion turbine means to said compressor.

4. An auxiliary refrigerated air system comprising, in combination;

A. a compressor having an input for receiving high pressure, high temperature input air and operating to produce at an output thereof discharge air of increased pressure and temperature;

B. expansion turbine means for extracting energy from said discharge air to produce refrigerated output air;

C. an output duct communicating with said expansion turbine means for conveying said output air to a utilization location;

D. means for diverting a portion of said input air from said compressor to a first anti-icing means in heat exchanging relation with said expansion turbine means, so as to prevent ice accretion therein; and E. second anti-icing means in heat exchanging relation with said output duct for warming said output duct to prevent ice accretion thereto;

F. wherein said second anti-icing means includes a manifold surrounding said output duct and receiving a further portion of said input air from said means for diverting to warm said output duct.

5. The auxiliary refrigerated air system defined in claim 4, wherein said output duct includes a wall having a plurality of orifices through which said further input air portion is injected form said manifold into said duct to create a warm air layer separating said duct wall from said output air and warming the surface of said duct wall.

6. An auxiliary refrigerated air system comprising, in combination:

A. a compressor having an input for receiving high pressure, high temperature input air and operating to produce at an output thereof discharge air of increased pressure and temperature;

B. expansion turbine means for extracting energy from said discharge air to produce refrigerated output air;

C. an output duct communicating with said expansion turbine means for conveying said output air to a utilization location;

D. means for diverting a portion of said input air from said compressor to a first anti-icing means in heat exchanging relation with said expansion turbine means, so as to prevent ice accretion therein; and E. second anti-icing means in heat exchanging relation with said output duct for warming said output duct to prevent ice accretion thereto; and F. a first heat exchanger having a first heat exchanging coil through which said discharge air from said compressor flows to said expansion turbine means and a second heat exchanging coil through which a heat sinking fluid flows, and wherein said second anti-icing means includes a second heat exchanger having a third heat exchanging coil surrounding said output duct and through which said heat sinking fluid flows prior to flowing through said second heat exchanging coil of said first heat exchanger.

7. An auxiliary refrigerated air system comprising, in combination:

A. a compressor having an input for receiving high pressure, high temperature input air and operating to produce at an output thereof discharge air of increased pressure and temperature;

B. expansion turbine means for extracting energy from said discharge air to produce refrigerated output air;

C. an output duct communicating with said expansion turbine means for conveying said output air to a utilization location;

D. an anti-icing means in heat exchanging relation with said output duct for warming said output duct to prevent ice accretion thereto, wherein said anti-icing means comprises a manifold surrounding said output duct; and E. first and second interconnected dividing valves, said first dividing valve diverting a portion of said input air to said second dividing valve, and said second dividing valve dividing said input air portion into first and second input air sub-portions, said first input air sub-portion flowing through internal cavities of said expansion turbine means to warm surfaces thereof to prevent ice accretion, and said second input air sub-portion flowing into said manifold to warm said output duct.

8. The auxiliary refrigerated air system defined in claim 7, wherein said output duct includes a wall having a plurality of orifices through which said second input air sub-portion is injected from said manifold into said duct to create a warm air layer separating said duct wall from said output air and warming the surface of said duct wall.

9. In combination with an aircraft gas turbine engine having an air compressor, an auxiliary refrigerated air system comprising, in combination:

A. an auxiliary compressor having an input for receiving high pressure, high temperature input air from the engine compressor and operating to produce at an output thereof discharge air of increased pressure and temperature;

B. a heat exchanger having a first heat exchanging coil connected with said auxiliary compressor output to receive said discharge air and a second heat exchanging coil through which a heat sinking fluid flows;

C. expansion turbine means drivingly connected to operate said auxiliary compressor and having an input connected with said first heat exchanging coil for receiving said discharge air, said expansion turbine means operating to extract energy from said discharge air and produce refrigerated output air at an output thereof;

D. an output duct communicating with said expansion turbine means output for conveying said output air to a utilization location;

E. means for diverting a portion of said input air form said auxiliary compressor to a first anti-icing means in heat exchanging relation with said expansion turbine means, so as to prevent ice accretion therein; and F. second anti-icing means in heat exchanging relation with said output duct for warming said output duct to prevent ice accretion thereto; and G. wherein said input air portion exits from said first anti-icing means into said output duct wherein said input air portion mixes with said refrigerated output air entering said output duct from said expansion turbine means.

10. The auxiliary refrigerated air system defined in claim 9, wherein said second anti-icing means includes a manifold exterior to and surrounding said output duct and receiving a further portion of said input air which flows along an exterior of said output duct to warm said output duct.

11. The auxiliary refrigerated air system defined in claim 9, wherein said second anti-icing means includes a third heat exchanging coil surrounding said output duct and connected with said second heat exchanging coil such that said heat sinking fluid flows first through said third heat exchanging coil and then through said second heat exchanging coil.

12. The auxiliary refrigerated air system defined in claim 11, wherein said heat sinking fluid is fuel for the gas turbine engine.

13. In combination with an aircraft gas turbine engine having an air compressor, an auxiliary refrigerated air system comprising, in combination:
- A. an auxiliary compressor having an input for receiving high pressure, high temperature input air from the engine compressor and operating to produce at an output thereof discharge air of increased pressure and temperature;
- B. a heat exchanger having a first heat exchanging coil connected with said auxiliary compressor output to receive said discharge air and a second heat exchanging coil through which a heat sinking fluid flows;
- C. expansion turbine means drivingly connected to operate said auxiliary compressor and having an input connected with said first heat exchanging coil for receiving said discharge air, said expansion turbine means operating to extract energy from said discharge air and produce refrigerated output air at an output thereof;
- D. an output duct communicating with said expansion turbine means output for conveying said output air to a utilization location;
- E. means for diverting a portion of said input air form said auxiliary compressor to a first anti-icing means in heat exchanging relation with said expansion turbine means, so as to prevent ice accretion therein; and
- F. second anti-icing means in heat exchanging relation with said output duct for warming said output duct to prevent ice accretion thereto;
- G. wherein said second anti-icing means includes a manifold surrounding said output duct and receiving a further portion of said input air to warm said output duct;
- H. wherein said output duct includes a wall having a plurality of orifices through which said further input air portion is injected from said manifold into said duct to create a warm air layer separating said duct wall from said output air and warming the surface of said duct wall.

14. In combination with an aircraft gas turbine engine having an air compressor, an auxiliary refrigerated air system comprising, in combination:
- A. an auxiliary compressor having an input for receiving high pressure, high temperature input air form the engine compressor and operating to produce at an output thereof discharge air of increased pressure and temperature;
- B. a heat exchanger having a first heat exchanging coil connected with said auxiliary compressor output to receive said discharge air and a second heat exchanging coil through which a heat sinking fluid flows;
- C. expansion turbine means drivingly connected to operate said auxiliary compressor and having an input connected with said first heat exchanging coil for receiving said discharge air, said expansion turbine means operating to extract energy from said discharge air and produce refrigerated output air at an output thereof;
- D. an output duct communicating with said expansion turbine means output for conveying said output air to a utilization location;
- E. an anti-icing means in heat exchanging relation with said output duct for warming said output duct to prevent ice accretion thereto, said anti-icing means including a manifold surrounding said output duct; and
- F. first and second interconnected dividing valves, said first dividing valve diverting a portion of said input air to said second dividing valve, and said second dividing valve dividing said input air portion into first and second input air sub-portions, said first input air sub-portion flowing through internal cavities of said expansion turbine means to warm surfaces thereof to prevent ice accretion, and said second input air sub-portion flowing into said manifold to warm said output duct;
- G. wherein said output duct includes a wall having a plurality of orifices through which said second input air sub-portion is injected form said manifold into said duct to create a warm air layer separating said duct wall from said output air and warming the surface of said duct wall.

* * * * *